March 18, 1924.
W. P. REAVES
OPTICAL APPARATUS
Filed Dec. 6, 1922
1,487,473
2 Sheets-Sheet 1
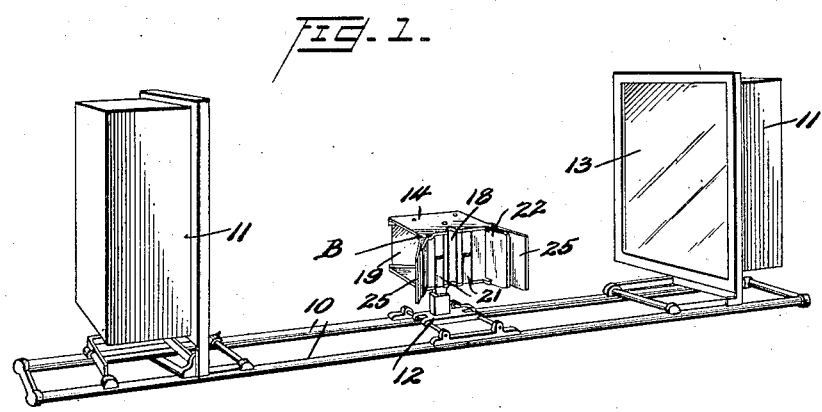
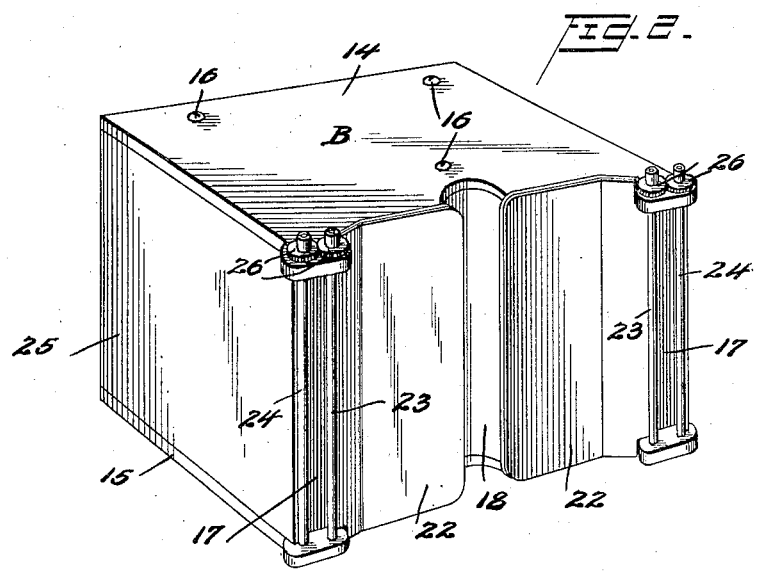
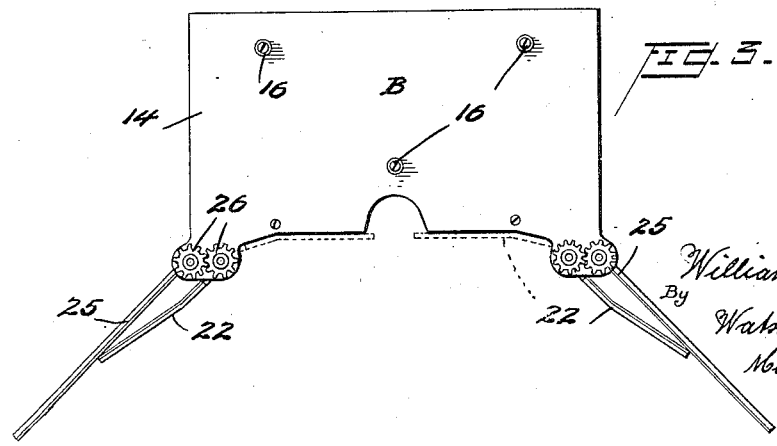
Inventor
William P. Reaves,
By Watson, Coit, Morse & Grindle,
Attorneys March 18, 1924.

W. P. REAVES

OPTICAL APPARATUS

Filed Dec. 6, 1922

Inventor
William P. Reaves,
By Watson, Coit, Morse & Grindle,
Attorneys.

Patented Mar. 18, 1924.

1,487,473

UNITED STATES PATENT OFFICE.

WILLIAM P. REAVES, OF GREENSBORO, NORTH CAROLINA.

OPTICAL APPARATUS.

Application filed December 6, 1922. Serial No. 605,213.

*To all whom it may concern:*

Be it known that I, WILLIAM P. REAVES, a citizen of the United States, and residing at Greensboro, Guilford County, State of North Carolina, have invented certain new and useful Improvements in Optical Apparatus, of which the following is a specification.

The present invention relates to stereoscope and particularly to stereoscope employed in radiographic diagnosis.

In preparing to make a radiographic diagnosis, particularly where it is desired to obtain a true estimate of the position of a foreign object or study the tissue changes in disease within the human body, it is the present practice to take two separate radiographs with the target of the X ray tube at points about $2\frac{1}{4}''$ apart, which is the average interpupillary distance, and to mount the paired radiographs in the stereoscope to be simultaneously observed by the diagnostician, mirrors being provided so that the observer will see one plate with one eye and the second plate with the other eye.

The observer's eyes viewing the paired radiographs reflected from the two mirrors his eyes positioned at the two relative points of the target of the X ray tube from which the radiographs were taken gives an impression of relief from which the diagnostician can make deductions as to size, depth and position of foreign bodies in the human body and study changes of the tissues in diseases. Accuracy of the interpretation of the radiographs is in direct ratio to the radiographs, their illumination and the reproduction of the radiograph reflected to the observer's eyes by mirrors. Heretofore the mirrors used for stereoscopes were not protected from dust or the observer's breath and were silvered on the back surface giving two reflecting surfaces. The objective point reflected from the first surface is nearer the objective point than the objective point reflected from the second surface, a distance equal to the incident of the light rays from the two surfaces. The reflection of the radiograph from the first surface is less visible than the reflection of the radiograph from the second surface which fogs the reflection of the radiograph from the second surface in the same ratio as the light rays reflected from the first and second surfaces and blurs the reflection of the radiograph from the second surface, the most visible, by the displacement which is equal to the incident of the light rays from the first and second surfaces.

In practice the radiographic plates are positioned exactly opposite each other and in parallel planes and the mirror device is interposed therebetween, having mirrors arranged at an angle of 90° to each other and at angles of 45° with the two lines of sight of the eyes of the observer.

It is the object of the present invention to provide a mirror device for stereoscopes of the greatest possible accuracy and protection which will enable the observer to see the plates clearly and to obtain the proper perception of relief without fogging and blurring of the image in the manner described above. To this end I employ mirrors of glass which are silvered upon their faces instead of upon their rear surfaces which are very sensitive in that their reflecting surfaces are easily injured by the breath of the observer and by floating dust particles, I provide a special container which protects them when not in use from the dust floating in the atmosphere, from the breath of the observer when in use.

The means for preventing dust from entering the holder when the mirrors are not in use also prevents lateral rays of light from striking the eye of the observer when the instrument is being used. The mirror holding and protecting device comprises essentially a box in which the mirrors are arranged at an angle of 90° to each other, the front and side walls of which are hinged thereto and movable into a plurality of positions. They may be folded against the box so that no dust may enter when the instrument is not being used, or they may be swung outward to expose the mirrors, and in such position serve as light guards, protecting the observer's eyes from rays of light other than those coming from the mirror surfaces.

It will be understood that the invention may have a number of different embodiments and that that form which is herein described and illustrated in the accompanying drawings is given by way of example only.

In the drawings:

Fig. 1 is a perspective view of a stereoscopic apparatus showing the invention incorporated therewith;

Fig. 2 is a perspective view of the improved mirror supporting and protecting box, the box being closed;

Fig. 3 is a top plan view of the same, the box being open;

Details of the stereoscope are not shown but it will be understood that the trackway 10 is suitably supported upon a stand or table and in turn slidably supports the plate holding devices 11 and the mirror stand 12, so that these three members are relatively adjustable. The plate holding devices 11 are so arranged that the plates 13 held thereby are axially aligned and parallel.

Figure 4:
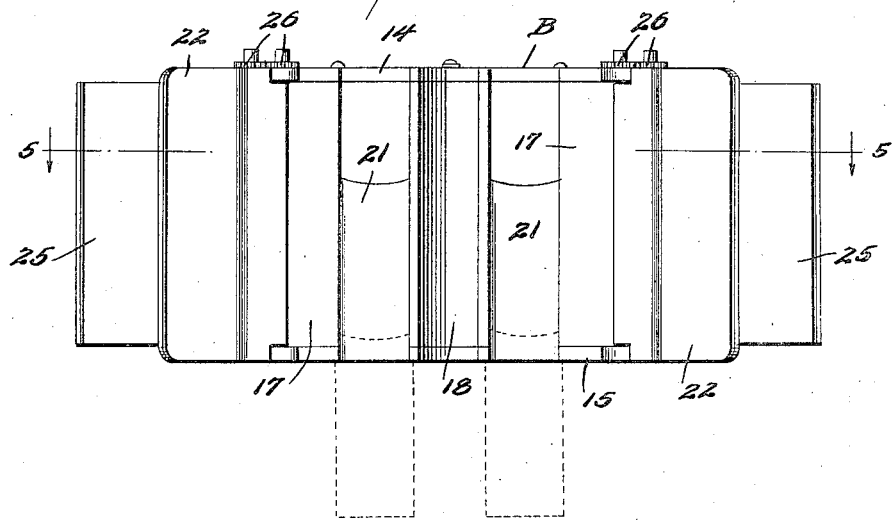
Fig. 4 is a front elevation of the same.

The mirror stand 12 supports the mirror holding and protecting box B which will now be described in detail. This box comprises parallel top and bottom plates 14 and 15 respectively which are held in fixed spaced relation by rods 16, vertical plates or walls 17, and the reentrant vertically extending nose guard 18. The mirrors 19 are arranged at an angle of 90° with each other and are silvered at 20 on their front faces. The eyes of the observer are usually positioned as shown in dotted lines in Figure 5 so that the lines of sight of the two eyes are deflected 90° by the mirrors respectively. The vertical slots or spaces between the plates 17 and the nose 18 constitute the view apertures and slides 21 are provided by means of which these apertures may be partially closed, as shown in Figure 4. In this figure the slides are shown in their normal position and the observer looks over their upper edges but, if he desires to lower his line of sight, the slides may be lowered to dotted line position (Figure 4). The slides, the nose piece 18, and the walls 17 together substantially close the face of the box so that the breath of the observer cannot contact with the mirrors to destroy the same.

Figure 5:
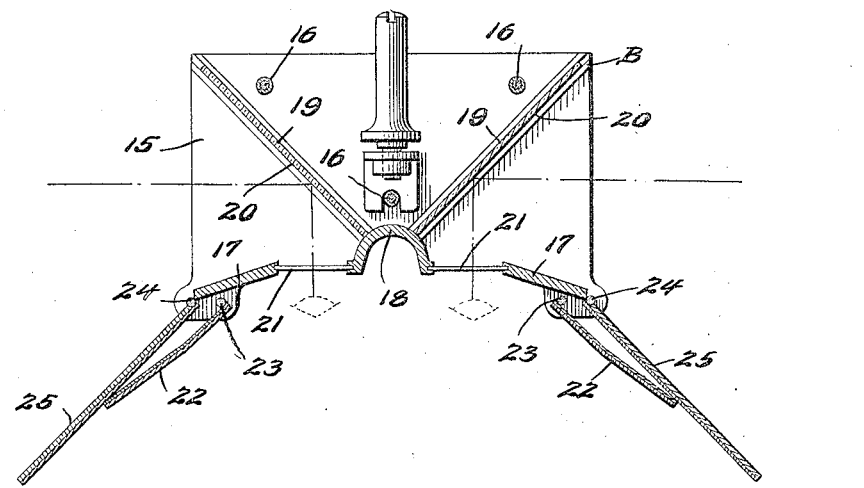
Fig. 5 is a section on line 5—5 of Figure 4.

The view apertures are completely closed when the stereoscope is not in use by means of shutters or doors 22 respectively, rigidly secured to rods 23, rotatably mounted in the top and bottom of the box. These shutters are adapted to swing from the positions in which they are illustrated in Figure 2 to the positions in which they are shown in Figures 3 and 5. Positioned adjacent and parallel to the rods 23 are rods 24 also rotatably supported in the top and bottom of the box and to these rods are secured doors or shutters 25 which are adapted to swing from closed position as shown in Figure 2, and in dotted lines in Figure 3, to open position as shown in full lines in Figure 3, and also in Figure 5. Rods 23 and 24 are connected for simultaneous movement by means of gears 26 secured to their upper ends so that the operator in moving either door about its pivotal axis at the same time swings the other. Due to the interconnection of rods 23 and 24, the doors 22 and 25 necessarily assume definite relative positions when open, each door constituting a stop limiting the swinging movement of the other, as will be apparent from a study of Figures 3 and 5 of the drawings.

The walls 17 of the box, together with the doors 22 and 25, constitute guards which will prevent lateral rays of light from striking the eye of the observer, particularly those rays coming directly from the radiographs, which would tend to confuse the observer. When the shutters on the box are closed it is impossible for dust particles in the air to come into contact with the surface of the mirror and for drafts of moisture laden air to strike the mirrors, so that they are substantially protected when the stereoscope is not in use. While being used the mirrors are given a maximum protection in that the protective means provided absolutely prevents the breath of the observer from striking the mirror surfaces. With the protective supporting casing just described it is possible, as before explained, to utilize mirrors which are silvered on their front surfaces instead of on their rear surfaces, thus increasing the accuracy of the instrument to a considerable degree. It will be understood that the invention may have a number of different embodiments and that it is not limited to the form which has been disclosed by way of example.

Having thus described the invention what is claimed as new and desired to be secured by Letters Patent is:

1. A device of the class described which comprises a box containing a mirror and having openings in front of said mirror through which the light rays from the objective may pass to the mirror and from the mirror to the observer's eye respectively, a closure for each of said openings mounted on the box and movable into a plurality of positions, in one of which positions it serves to close the opening in said box and in another position to act as a guard to prevent lateral light rays from striking the eye of the observer, said closures being connected together for simultaneous operation.

2. A device of the class described which comprises a box containing a mirror and having openings in front of said mirror through which the light rays from the objective may pass to the mirror and from the mirror to the observer's eye respectively, a closure for each of said openings mounted on the box and movable into a plurality of positions, in one of which positions it serves to close the opening in said box and in another position to act as a guard to prevent lateral light rays from striking the eye of the observer, said closures being geared together for simultaneous swinging movement.

3. A device of the class described which comprises a box, two mirrors in said box at an angle of 90° to each other, two openings in the side of said box and in the same plane which constitute viewing apertures, two openings in parallel planes through which rays of light from the objective may reach the mirror, and a swinging closure for each of said openings, said closures being connected in pairs for simultaneous movement.

4. A device of the class described which comprises a box, two mirrors in said box at an angle of 90° to each other, two openings in the side of said box and in the same plane which constitute viewing apertures, two openings in parallel planes through which rays of light from the objective may reach the mirror, and a swinging closure for each of said openings, said closures being connected in pairs for simultaneous movement, each closure constituting a stop for limiting swinging movement of the other to open position.

5. A device of the class described which comprises a box, two mirrors arranged at an angle and having a theoretical line of intersection adjacent one side of the box, that side of the box adjacent the line of intersection of the mirrors being closed except for two viewing apertures and serving as a guard to prevent the breath of the observer from reaching the mirror surfaces, and means for enlarging the view openings.

6. A device of the class described which comprises a box, two mirrors arranged at an angle and having a theoretical line of intersection adjacent one side of the box, that side of the box adjacent the line of intersection of the mirrors being closed except for two viewing apertures and serving as a guard to prevent the breath of the observer from reaching the mirror surfaces, and means whereby the lower edge of the viewing apertures may be raised or lowered, for the purpose set forth.

7. A device of the class described which comprises a box, two mirrors arranged at an angle and having a theoretical line of intersection adjacent one side of the box, that side of the box adjacent the line of intersection of the mirrors being closed except for two viewing apertures and serving as a guard to prevent the breath of the observer from reaching the mirror surfaces, and means for adjusting the lower edge of the viewing apertures for the purpose set forth, said means comprising vertically movable slides.

In testimony whereof I hereunto affix my signature.

WILLIAM P. REAVES.